March 4, 1958  O. B. SCHOENFELD  2,825,422
EMULSION SEPARATOR
Filed Sept. 16, 1954  2 Sheets-Sheet 1

Otto B. Schoenfeld
INVENTOR.

BY Murray Robinson
ATTORNEY

March 4, 1958　　O. B. SCHOENFELD　　2,825,422
EMULSION SEPARATOR

Filed Sept. 16, 1954　　2 Sheets-Sheet 2

Otto B. Schoenfeld
INVENTOR.

BY Murray Robinson
ATTORNEY

United States Patent Office 2,825,422
Patented Mar. 4, 1958

2,825,422
EMULSION SEPARATOR

Otto B. Schoenfeld, Houston, Tex.

Application September 16, 1954, Serial No. 456,545

8 Claims. (Cl. 183—2.7)

This invention pertains to emulsion separation and more particularly to separating out the water from an oil-water emulsion constituting the natural fluid taken from a petroleum well. It is to be understood that the water phase of such an emulsion may not be pure water, for example it is oftentimes salt water or brine, and that as used herein the term water is intended to cover such impure fluid. Likewise the term oil as used herein is intended to cover impure oils and oils of varying composition. Although the invention is of general application to the separation of an emulsion formed of two immiscible liquid fractions of different densities, for purposes of illustration the invention will be described in connection with the separation of oil and water.

This application is a continuation-in-part of my prior patent application S. N. 267,465, filed January 21, 1952, entitled "Emulsion Separator," which application issued as United States Patent Number 2,693,880, issued November 9, 1954.

It is an object of the invention to provide a method and apparatus for emulsion separation which will effect more nearly perfect emulsion separation.

It is a further object of the invention to provide a method and apparatus for emulsion separation which can process the emulsion at a higher rate for a given size apparatus.

It is a further object of the invention to provide a method and apparatus for emulsion separation which is more economical as to initial cost, cost of operation, and cost of maintenance and repair.

It is a further object of the invention to provide a separator which can be easily transported to location.

Other objects and advantages of the invention will appear from the following description of a preferred embodiment thereof.

According to the method of the invention emulsion which comprises a continuous oil phase and a dispersed water phase is introduced into a body of water beneath the interface between the body of water and an emulsion resting on the water, the latter emulsion being of higher oil concentration than the first. Because the first mentioned emulsion is lighter than the water, it rises through the water into contact with the lower surface of the higher oil concentration emulsion. This surface has a relatively large radius of curvature, that is, it is substantially a plane surface. The first mentioned emulsion on the other hand, breaks up during its upward travel through the water into globules of relatively small radius of curvature. Because of the similarity to the break up of falling liquid into drops, the globules of emulsion will be called drops although they are rising, not falling. As the drops merge or coalesce with the higher oil concentration emulsion at the lower surface thereof, they flatten out and the water dispersed within each of the emulsion drops is thus deposited in the larger body of higher oil concentration emulsion at a point extremely close to the lower surface thereof, and since the dispersed water is heavier than the oil it tends to fall out through this lower surface and is only retained by the surface tension of the oil. As this process is continued the water resting on the lower surface of the higher oil concentration emulsion finally collects in such quantity as to first distort the surface downwardly and finally break therethrough into the water below. This maintains the static emulsion of higher oil concentration than the rising drops. As the quantity of higher oil concentration emulsion increases, the excess over the original amount is removed and introduced into the water beneath the interface with a body of still higher oil concentration emulsion. This is repeated at a plurality of interfaces until the oil leaving the last interface is nearly perfectly free of water. The emulsion at each emulsion-water interface is heated to assist in separating the water by lowering the surface tension of the oil.

An apparatus for carrying out the method embodying the invention is shown in the accompanying drawings wherein.

Figure 1:
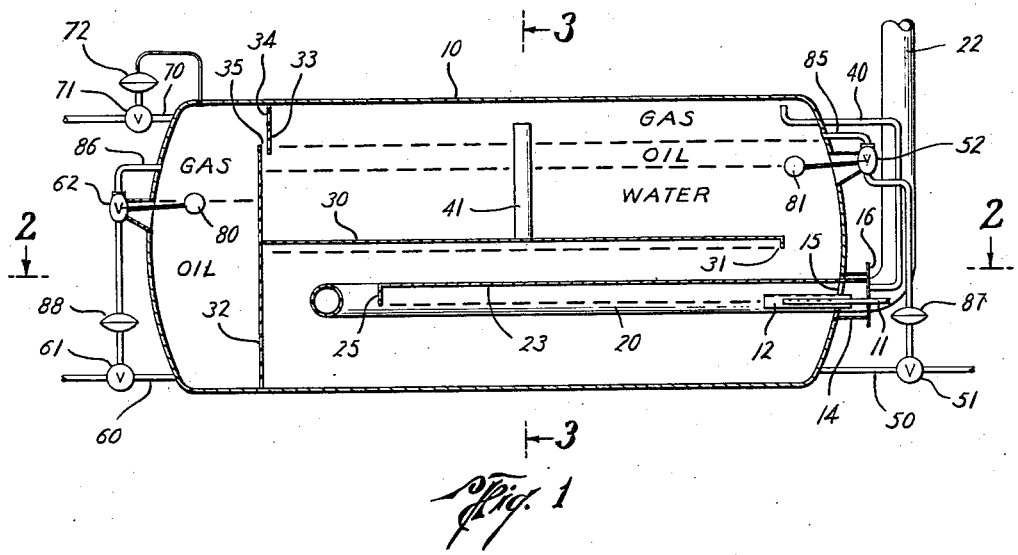
Figure 1 is a vertical section through a separator embodying the invention.

Referring now especially to Figure 1 there is shown a separator comprising an elongated tank 10, of generally cylindrical shape, with its longitudinal or cylinder axis disposed in a horizontal position. There is an emulsion inlet pipe 11 at one end of the tank in the lower part thereof. Over the inner end of the pipe is disposed cylindrical baffle 12 which has a larger diameter than pipe 11 leaving an annular passage therebetween. The end of cylinder 12 adjacent the inner end of pipe 11 is closed and spaced from pipe 11. The other end of cylinder 12 is open providing communication with the space 13 inside housing 14 which is secured around an opening 15 in the end of tank 10. The housing 14 is closed by a removable cover 16, fastened in place by suitable means (not shown).

Figure 2:
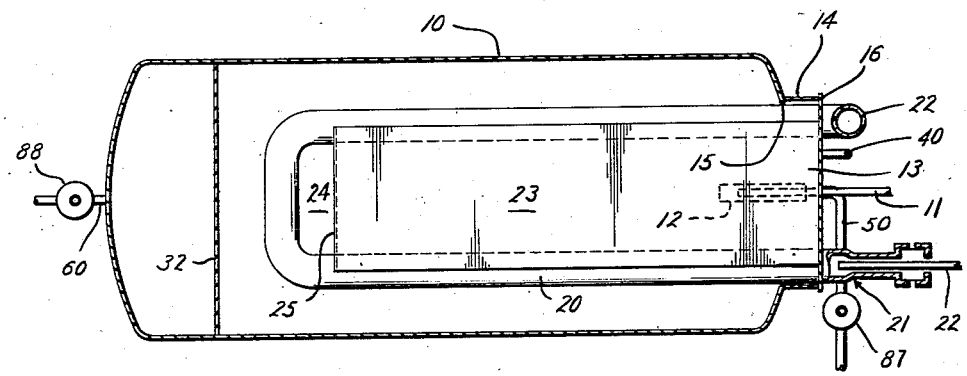
Figure 2 is a horizontal section on line 2—2 of Figure 1.

As best shown in Figure 2, through cover 16 extends a tube 20 which makes a return or U bend within tank 10 and emerges again through cover 16, the junctures of tube 20 with cover 16 is sealed by suitable means, not shown, also, pipe 11 which also extends through cover 16 is similarly sealed thereto so that tank 10, housing 14 and cover 16 form a fluid tight pressure vessel.

At one end of tube 20 is connected a gas burner schematically shown at 21 connected by pipe 22 to a suitable source of gas (not shown). The other end of tube 20 is connected to a vertically rising stack 22. Between the inlet and outlet portions of tube 20 at the top thereof extends a web 23 which is fastened fluid tight to tube 20 along the longitudinal edges of the web and to cover 16 at one end. The other end of web 23 terminates short of the bend in tube 20 leaving a space or passage 24. There is a downturned skirt 25 at the free end of web 24, the skirt being fastened fluid tight at its edges to tube 20 and extending down to a level above the bottom of tube 20. A trap or inverted cup is thus formed by tube 20, web 23, cover 16, and skirt 25 over the open end of pipe 12 into which emulsion is admitted from inlet pipe 11.

Figure 3:
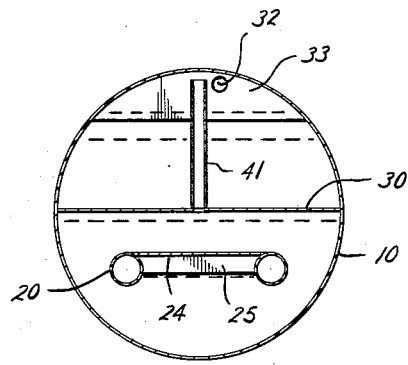
Figure 3 is a vertical section on line 3—3 of Figure 1.
Figure 4:
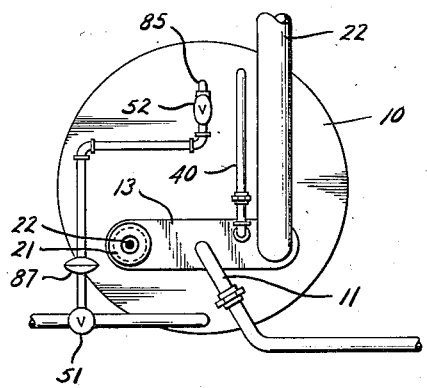
Figure 4 is a view of the right end of the apparatus shown in Figure 1.

Fluid escaping from the trap will pass under skirt 25 through space 24 up into another trap formed in part by a horizontal plate 30 (see Figures 1 and 3) fastened fluid tight to the sides of tank 10. This second trap is completed by a skirt 31 depending from plate 30 at one end thereof a distance similar to skirt 25, and a vertical plate 32 at the other end extending from the bottom of the tank into the top portion thereof. Skirt 31 and plate 32 are fastened fluid tight to the sides of tank 10 and the ends of plate 30.

The upper edge 35 of plate 32 is straight and horizontal forming a weir. Liquid escaping under plate 23 and accumulating above plate 30 can flow over the weir into the space at the end of the tank on the other side of plate 32. Another vertical plate 33, also secured fluid tight to tank 10 at the top thereof, extends down to a straight horizontal edge slightly below the upper edge of plate 32. Plate 33 serves to skim the foam from liquid flowing over the weir formed by the upper edge of plate 32. There is a passage 34 through plate 33 near the top thereof so that the spaces on opposite sides of plate 33 at the top of the tank are in communication with each other forming a single gas accumulation chamber. The bottom trap comprising web 23 is vented directly to this gas accumulation chamber by vent pipe 40. The upper trap comprising plate 30 is directly vented to the gas accumulation chamber by pipe 41.

At the bottom of tank 10 at the emulsion inlet end thereof is a water outlet pipe 50 controlled by valve 51 responsive to float type liquid level regulator 52 of any suitable type. At the bottom of the other end of tank 10 there is an oil outlet pipe 60 controlled by valve 61 responsive to float type liquid level regulator 62. At the oil outlet end of tank 10 near the top thereof is a gas outlet pipe 70 controlled by valve 71 responsive to gas pressure regulator 72.

In operation of the device, emulsion will enter through pipe 11 into the lower trap. Here the emulsion is heated from tube 20 and from web 23, skirt 25, and cover 16 which are in metallic contact with tube 20, all of the parts of the apparatus being made of metal preferably. The water in the heated emulsion tends to drop out through the water emulsion interface. The remaining oil rich emulsion escapes from under skirt 25 and floats up through passage 24 into the upper trap comprising plate 30. Here additional water drops out as the emulsion travels along the long path under plate 30 adjacent the water-emulsion interface before escaping under skirt 31 into the upper portion of the tank. In the upper portion of the tank, the very oil rich emulsion collects and further water drops out as the emulsion travels along the oil water interface toward plates 32 and 33. The liquid escaping under plate 33 and over plate 32 into the end of the tank will be nearly pure oil. Any gas rising from the oil will collect in the upper part of this end of the tank and mix with the gas on the other side of plate 33 through passage 34. The baffle 33 will have the effect of blocking the passage of gas-oil foam or bubbles from the separated part of the tank to the oil collection end thereof.

It will be noted that in effect the separator portion of the tank is a separate receptacle having means to admit emulsion at 11, means to let out water below at 50, means to let out oil above at 35, and above that at 34 a gas exit means.

The float 80 of regulator 62 will rest on the oil in the oil collection end of the tank 10. The float 81 of the regulator 52 will rest on the water at the oil-water interface in the uppermost trap formed by the top of the separator portion of the tank 10. The power for operating the valves 51 and 61 may be obtained from the gas collected in the top of the tank, in which case regulators 52 and 62 control the flow of gas from gas inlet pipes 85, 86 to diaphragm motors 87, 88 respectively. It is to be understood that the term "gas" as used in this specification and the appended claims, includes the vapor phase of the principal liquids in the separator as well as other gases that may be included in the emulsion.

Certain advantages of the foregoing structure are the low height of the apparatus whereby it can be transported by truck to location, the large areas of the water-emulsion and water-oil interfaces provided which promote the separation of the water, the direct venting of the lower and intermediate traps to the gas collection space in the top trap which avoids turbulence in the separator, the removal of the oil from the last trap through the foam skimmer which eliminates the problem of gas-oil foam in the final product, and the efficient heating of the emulsion in the first trap by the heat exchanger almost completely surrounding it. If desired similar heat exchange tubing could be disposed around the upper trap and additional traps could also be provided. This apparatus is easily cleaned by removing cover 16 and connected parts.

While a preferred embodiment of the invention has been shown and described, many modifications thereof can be made by one skilled in the art without departing from the spirit of the invention, and it is intended to cover by Letters Patent all forms of the invention falling within the scope of the following claims:

I claim:

1. Apparatus for separating the heavy liquid and light liquid fractions and gas of an emulsion, said apparatus comprising a liquid receptacle in the form of an elongated body having its longitudinal axis horizontally disposed; inlet means to admit emulsion to the receptacle; outlet means to let out light liquid from the receptacle above the level of said inlet means; drain means below said inlet means to let heavy liquid out of said receptacle; exit means to let gas out of said receptacle above the level of said inlet and outlet means; the upper portion of said receptacle forming a gas accumulation chamber; a plurality of trap means each to catch and hold a body of the liquid rising in said receptacle, said trap means being disposed in the path between said inlet and outlet means and spaced apart along said path, each trap to hold its said body of liquid in said path between said inlet and outlet means whereby liquid rising in said receptacle impinges against the lower surfaces of said held bodies of liquid in said trap means, said traps comprising horizontal plates extending lengthwise of said receptacle, each plate being connected at one end to one end of said receptacle and having its opposite end close to the opposite end of said receptacle with the ends of said plates that are connected to the ends of said receptacle being connected successively to alternate ends of said receptacle; vent means from each trap means to let out gas from each said trap means to said gas accumulation chamber, each said vent means including a passage having walls all the way from the trap means to said gas accumulation chamber to prevent gas in said passage from commingling with fluid in said receptacle while said gas is traveling from each said trap means to said gas accumulation chamber; and means to guide liquid rising in said receptacle against said body of liquid in the adjacent trap means disposed thereabove along said path after escaping from beneath the adjacent trap means below.

2. The combination of claim 1 in which said outlet means comprises a weir at one end of said receptacle and a skimmer plate spaced inside from the weir having its lower edge extending below the upper edge of the weir and its upper edge extending above said weir to block the passage of foam.

3. Apparatus for separating the heavy liquid and light liquid fractions and gas of an emulsion, said apparatus comprising a liquid receptacle, inlet means to admit emulsion to the receptacle, outlet means to let out light liquid from the receptacle above the level of said inlet means, drain means below said inlet means to let heavy liquid out of said receptacle, exit means to let gas out of said receptacle above the level of said inlet and outlet means, the upper portion of said receptacle forming a gas accumulation chamber, a plurality of trap means to catch and retain liquid rising in said receptacle disposed in the path between said inlet and outlet means and spaced apart in said path, vent means provided in each said trap means to let out gas from said trap means to said gas accumulation chamber, each said vent means including a passage having walls all the way from one said trap means to said gas accumulation chamber to prevent gas in said passage from commingling with fluid in said receptacle while said gas is traveling to said gas accumulation chamber, and means to guide liquid rising in said receptacle into the adjacent trap means disposed thereabove along said path after escaping from the adjacent trap means below; said receptacle being an elongated body having its longitudinal axis horizontally disposed; said traps comprising horizontal plates extending lengthwise of said receptacle, each plate being connected at one end to one end of said receptacle and having its opposite end close to the opposite end of said receptacle with the ends of said plates that are connected to the ends of said receptacle being connected successively to alternate ends of said receptacle; said outlet means comprising a weir at one end of said receptacle and a skimmer plate spaced inside from the weir having its lower edge extending below the upper edge of the weir and its upper edge extending above said weir to block the passage of foam, the upper edge of said skimmer plate being connected to said receptacle and said exit means comprising a passage through said skimmer plate.

4. The combination of claim 3 in which said weir forms one end of said receptacle and said elongated body forming said receptacle extends horizontally beyond said weir to provide a collection chamber on the opposite side of said weir from said trap means, said collection chamber being provided with a liquid outlet below said weir and a gas outlet above said liquid outlet.

5. The combination of claim 4 with means responsive to the level of the heavy liquid in said receptacle to control the flow through said drain means, means responsive to the level of liquid in said collection chamber to control the flow through said liquid outlet, and means responsive to the pressure in said collection chamber to control the flow through said gas outlet.

6. The combination of claim 1 with a U-shaped tube extending around said plate of one of said trap means with the ends of said tube in the end of said receptacle to which said plate is connected, a gas burner connected to one end of said tube, and a stack connected to the other end of said tube.

7. The combination of claim 5 in which said tube extends around the lowermost of said trap means.

8. The combination of claim 7 in which there is an opening in the end of said receptacle through which said ends of said tube and said plate and said inlet means extend, a housing around said opening connected to the end of said receptacle, and a cover over the end of said housing to which said tube, plate, and inlet means are connected.

References Cited in the file of this patent

UNITED STATES PATENTS

| | | |
|---|---|---|
| 2,319,962 | Walker | May 25, 1943 |
| 2,474,475 | Glasgow | June 28, 1949 |
| 2,528,032 | Candler et al. | Oct. 31, 1950 |
| 2,664,963 | Lovelady et al. | Jan. 5, 1954 |
| 2,713,919 | Walker et al. | July 26, 1955 |
| 2,717,081 | Wilson | Sept. 6, 1955 |
| 2,765,917 | Francis | Oct. 9, 1956 |
| 2,783,854 | Lovelady et al. | Mar. 5, 1957 |